(12) United States Patent
Gao et al.

(10) Patent No.: US 11,624,606 B2
(45) Date of Patent: Apr. 11, 2023

(54) METHODS AND APPARATUS FOR USING RANGE DATA TO PREDICT OBJECT FEATURES

(71) Applicant: Cognex Corporation, Natick, MA (US)

(72) Inventors: Chen Gao, Wayland, MA (US); Ivan Bachelder, Hillsborough, NC (US)

(73) Assignee: Cognex Corporation, Natick, MA (US)

( * ) Notice: Subject to any disclaimer, the term of this patent is extended or adjusted under 35 U.S.C. 154(b) by 522 days.

(21) Appl. No.: 16/796,726

(22) Filed: Feb. 20, 2020

(65) Prior Publication Data

US 2021/0262780 A1 Aug. 26, 2021

(51) Int. Cl.
*G01B 11/06* (2006.01)
*G01B 11/14* (2006.01)
*G01B 11/28* (2006.01)

(52) U.S. Cl.
CPC .......... *G01B 11/0608* (2013.01); *G01B 11/14* (2013.01); *G01B 11/28* (2013.01)

(58) Field of Classification Search
CPC ...... G01B 11/0608; G01B 11/14; G01B 11/28
See application file for complete search history.

(56) References Cited

U.S. PATENT DOCUMENTS

| | | | | |
|---|---|---|---|---|
| 9,600,720 B1 * | 3/2017 | Gray | ................ | G06K 9/6288 |
| 10,116,870 B1 * | 10/2018 | Nunnink | ............ | H04N 5/23296 |
| 10,688,841 B1 * | 6/2020 | Chen | ................... | B60G 17/0165 |
| 10,953,873 B2 * | 3/2021 | Buerkle | ............... | G06V 20/584 |
| 2005/0250094 A1 * | 11/2005 | Storhoff | ............... | C12N 15/115 |
| | | | | 435/5 |

(Continued)

FOREIGN PATENT DOCUMENTS

| | | | | |
|---|---|---|---|---|
| EP | 3 505 961 A1 | | 7/2019 | |
| EP | 3505961 A1 * | | 7/2019 | ........... G01S 17/023 |

(Continued)

OTHER PUBLICATIONS https://www.engineeringtoolbox.com/conveyor-belt-speed-d_506.html (2003) (Year: 2003).*

(Continued)

*Primary Examiner* — Dominic J Bologna
*Assistant Examiner* — Jarreas C Underwood
(74) *Attorney, Agent, or Firm* — Wolf, Greenfield & Sacks, P.C.

(57) ABSTRACT

Embodiments relate to predicting height information for an object. First distance data is determined at a first time when an object is at a first position that is only partially within the field-of-view. Second distance data is determined at a second, later time when the object is at a second, different position that is only partially within the field-of-view. A distance measurement model that models a physical parameter of the object within the field-of-view is determined for the object based on the first and second distance data. Third distance data indicative of an estimated distance to the object prior to the object being entirely within the field-of-view of the distance sensing device is determined based on the first distance data, the second distance data, and the distance measurement model. Data indicative of a height of the object is determined based on the third distance data.

22 Claims, 7 Drawing Sheets

(56) References Cited

U.S. PATENT DOCUMENTS

| | | | |
|---|---|---|---|
| 2006/0066836 A1* | 3/2006 | Bridges | G01B 11/024 356/29 |
| 2008/0204697 A1* | 8/2008 | Domenicali | G01C 11/12 356/2 |
| 2014/0009601 A1* | 1/2014 | Cho | G01B 11/0608 348/126 |
| 2016/0187476 A1* | 6/2016 | Wang | G01S 13/343 342/146 |
| 2018/0278823 A1* | 9/2018 | Horesh | H04N 5/23251 |
| 2018/0364045 A1* | 12/2018 | Williams | G01S 17/88 |
| 2019/0011557 A1* | 1/2019 | Weber | H04N 5/232121 |
| 2021/0335130 A1* | 10/2021 | Messer | G08G 1/161 |

FOREIGN PATENT DOCUMENTS

| | | |
|---|---|---|
| JP | 2002-133400 A | 5/2002 |
| JP | 2014-504721 A | 2/2014 |

OTHER PUBLICATIONS

EP 21156538.7, Jul. 20, 2021, Extended European Search Report.

Extended European Search Report dated Jul. 20, 2021 in connection with European Application No. 21156538.7.

[No Author Listed], A new generation, long distance ranging Time-of-Flight sensor based on ST's FlightSense™ technology. ST. VL53L1X Datasheet—production data. DocID031281 Rev 3. Nov. 2018; 35 pages.

Bhandari et al., Resolving Multi-path Interference in Time-of-Flight Imaging via Modulation Frequency Diversity and Sparse Regularization. Optics letteres. Apr. 2014; 39(06): 11 pages.

He et al., Depth Errors Analysis and Correction for Time-of-Flight (ToF) Cameras. Sensors. 2017; 17(92): 18 pages.

Li, Time-of-Flight Camera—An Introduction. Texas Instruments. Technical White Paper. SLOA190B Jan. 2014 Revised May 2014; 10 pages.

* cited by examiner

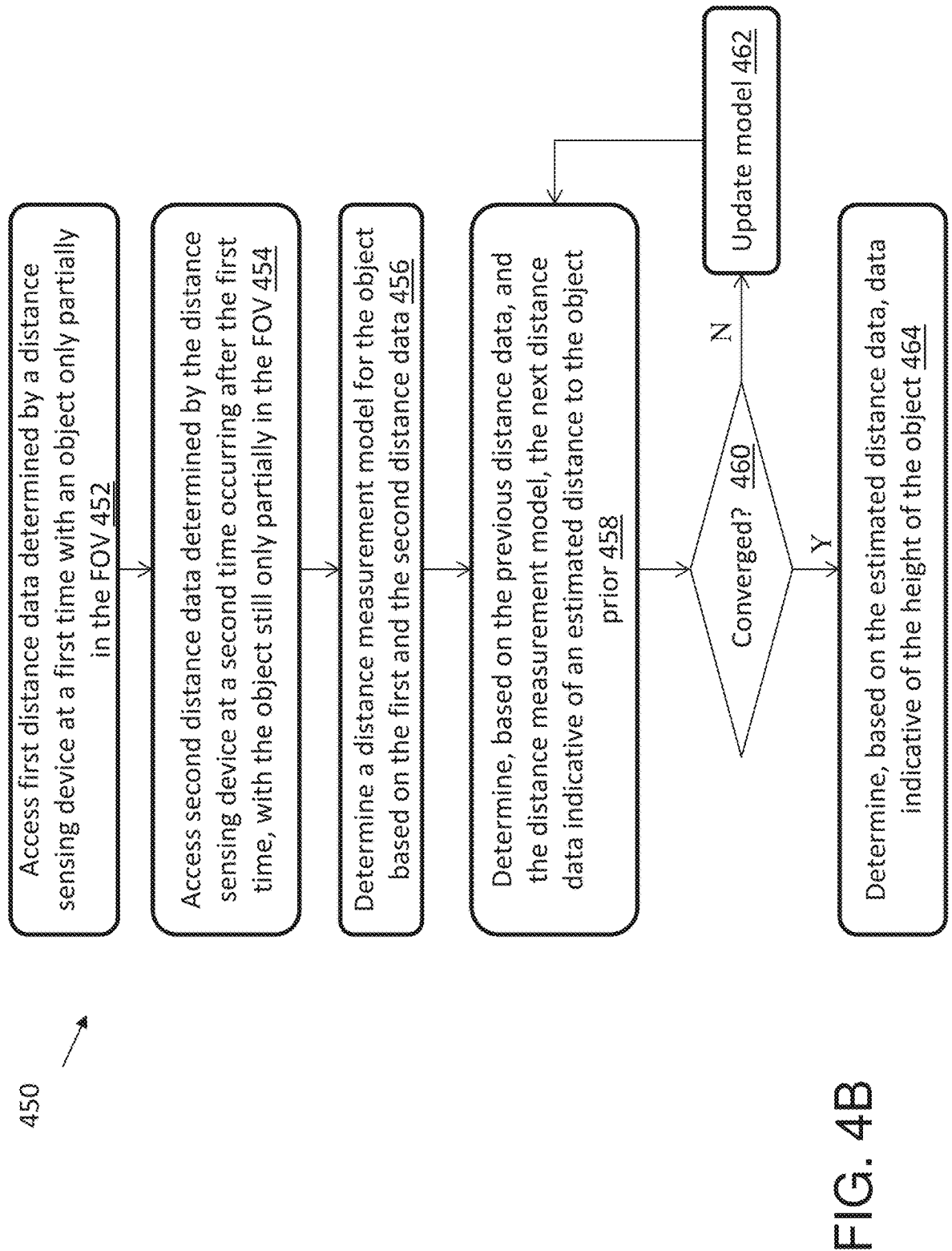

METHODS AND APPARATUS FOR USING RANGE DATA TO PREDICT OBJECT FEATURES

TECHNICAL FIELD

The techniques described herein relate generally to methods and apparatus for using range data to predict object features, including to predict the height of the object.

BACKGROUND

Vision systems can be used in a wide range of applications to perform tasks such as measuring objects, inspecting objects, aligning objects, and/or decoding symbology (e.g., barcodes). Such systems often include an image sensor that acquires images of the subject or object, and one or more processors (e.g., on-board and/or interconnected to the image sensor) that processes the acquired images. The image information can be provided as an array of image pixels that each have various colors and/or intensities. The vision system can be configured to generate a desired output based upon the processed images. For example, for a barcode reader, the imaging device can image an object that may contain one or more barcodes. The system can then process the image to identify barcode, which the system can then decode using a barcode decoding process.

SUMMARY

The techniques described herein, in some embodiments, relate to using a distance sensing device, such as a time-of-flight sensor, to measure range data to predict features of a moving object prior to when such features can be determined using existing techniques. In some embodiments, the techniques use the distance data to predict the height of the moving object to focus a lens assembly so that an imaging device (viewing a scene through the lens) can image the moving object at a sufficient focus that allows features of the object to be processed based on the images. For example, while a time-of-flight sensor may only be able to accurately measure the distance to an object when the object is entirely within the field of view of the time-of-flight sensor, the techniques can provide for predicting the distance to the object well before the object being entirely within the field of view of the time-of-flight sensor. The techniques can allow a machine vision system to process features such as physical characteristics of the object (e.g., object size, object area, spacing among objects, etc.), barcodes on the object, perform object inspection, and/or the like.

Some embodiments relate to a computerized method. The method includes accessing first distance data determined by a distance sensing device at a first time, wherein the distance sensing device determined the first distance data with an object at a first position within a field-of-view of the distance sensing device, wherein the object is only partially in the field-of-view at the first position. The method includes accessing second distance data determined by the distance sensing device at a second time occurring after the first time, wherein the distance sensing device determined the second distance data with the object at a second position within the field-of-view of the distance sensing device, wherein the first position is different than the second position, and the object is only partially in the field-of-view at the second position. The method includes determining a distance measurement model for the object based on the first distance data and the second distance data, wherein the distance measurement model is configured to model a physical parameter of the object within the field-of-view of the distance sensing device over time. The method includes determining, based on the first distance data, the second distance data, and the distance measurement model, third distance data indicative of an estimated distance to the object prior to the object being entirely within the field-of-view of the distance sensing device. The method includes determining, based on the third distance data, data indicative of a height of the object.

Some embodiments relate to an apparatus. The apparatus includes a processor in communication with a memory. The processor is configured to execute instructions stored in the memory that cause the processor to access first distance data determined by a distance sensing device at a first time, wherein the distance sensing device determined the first distance data with an object at a first position within a field-of-view of the distance sensing device, wherein the object is only partially in the field-of-view at the first position. The processor is configured to execute instructions stored in the memory that cause the processor to access second distance data determined by the distance sensing device at a second time occurring after the first time, wherein the distance sensing device determined the second distance data with the object at a second position within the field-of-view of the distance sensing device, wherein the first position is different than the second position, and the object is only partially in the field-of-view at the second position. The processor is configured to execute instructions stored in the memory that cause the processor to determine a distance measurement model for the object based on the first distance data and the second distance data, wherein the distance measurement model is configured to model a physical parameter of the object within the field-of-view of the distance sensing device over time. The processor is configured to execute instructions stored in the memory that cause the processor to determine, based on the first distance data, the second distance data, and the distance measurement model, third distance data indicative of an estimated distance to the object prior to the object being entirely within the field-of-view of the distance sensing device. The processor is configured to execute instructions stored in the memory that cause the processor to determine, based on the third distance data, data indicative of a height of the object.

Some embodiments relate to at least one non-transitory computer-readable storage medium. The non-transitory computer-readable storage medium stores processor-executable instructions that, when executed by at least one computer hardware processor, cause the at least one computer hardware processor to access first distance data determined by a distance sensing device at a first time, wherein the distance sensing device determined the first distance data with an object at a first position within a field-of-view of the distance sensing device, wherein the object is only partially in the field-of-view at the first position. The non-transitory computer-readable storage medium stores processor-executable instructions that, when executed by at least one computer hardware processor, cause the at least one computer hardware processor to access second distance data determined by the distance sensing device at a second time occurring after the first time, wherein the distance sensing device determined the second distance data with the object at a second position within the field-of-view of the distance sensing device, wherein the first position is different than the second position, and the object is only partially in the field-of-view at the second position. The non-transitory computer-readable storage medium stores processor-executable instructions that, when executed by at least one computer hardware processor, cause the at least one computer hardware processor to determine a distance measurement model for the object based on the first distance data and the second distance data, wherein the distance measurement model is configured to model a physical parameter of the object within the field-of-view of the distance sensing device over time. The non-transitory computer-readable storage medium stores processor-executable instructions that, when executed by at least one computer hardware processor, cause the at least one computer hardware processor to determining, based on the first distance data, the second distance data, and the distance measurement model, third distance data indicative of an estimated distance to the object prior to the object being entirely within the field-of-view of the distance sensing device. The non-transitory computer-readable storage medium stores processor-executable instructions that, when executed by at least one computer hardware processor, cause the at least one computer hardware processor to determine, based on the third distance data, data indicative of a height of the object.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4B is a diagram showing an exemplary detailed method for determining and updating a distance measurement model using distance sensing measurements, according to some embodiments of the technology described herein;

DETAILED DESCRIPTION

Figure 1:
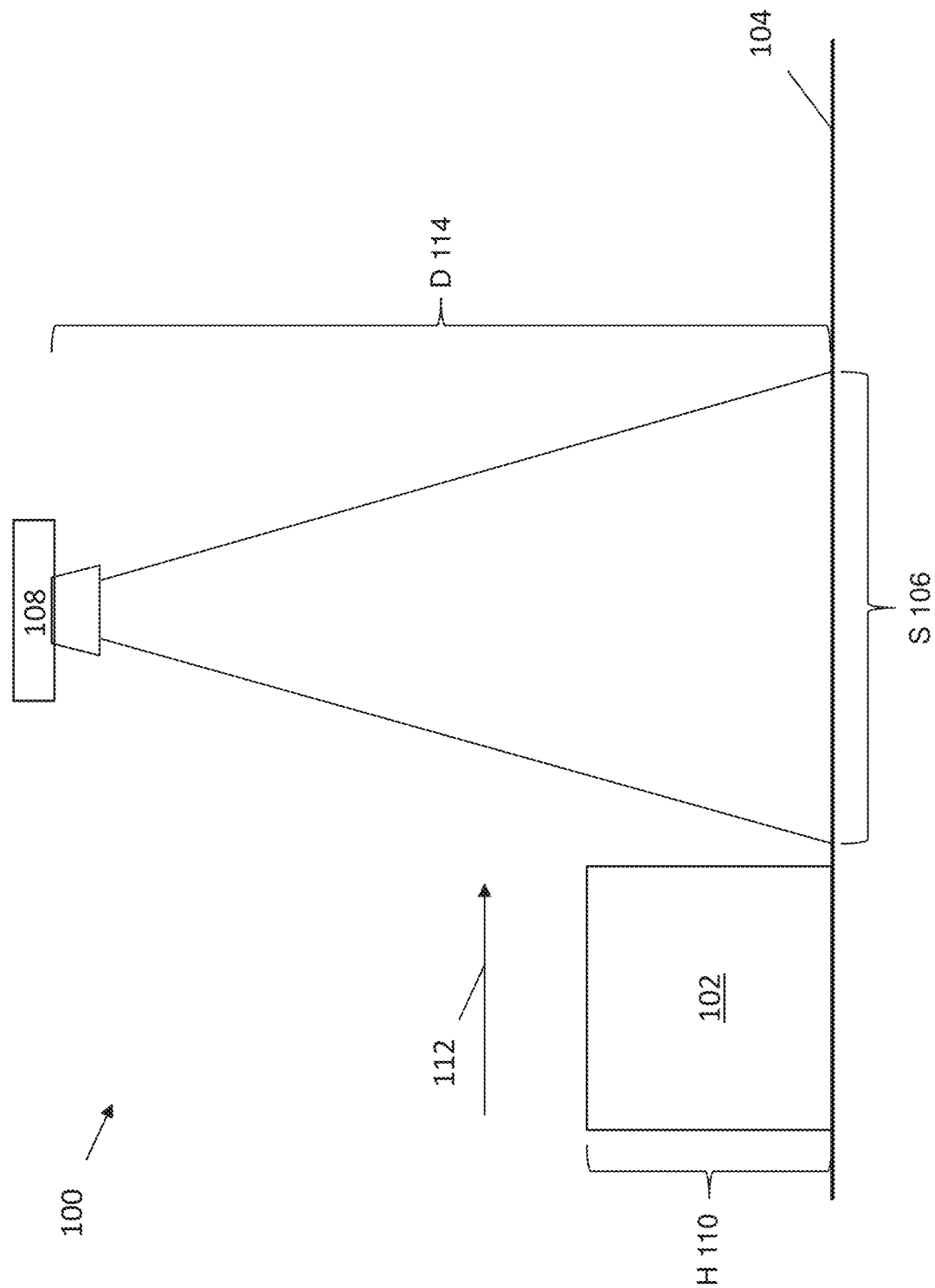
FIG. 1 is a diagram showing an exemplary machine vision system application with an object moving on a conveyor belt towards the field of view of an image sensing device, according to some embodiments of the technology described herein.

As described above, the techniques described herein can be used to predict object features for a variety of machine vision applications. For example, the techniques can be used for logistic machine vision applications, which include conveyor-based applications, sorting applications, and/or the like. Some logistics applications use a fixed focus lens that has a deep depth of field and a small aperture. As a result of the small aperture, the images may be not well illuminated because only limited light can pass through the lens. Alternatively, auto-focus techniques can be used instead of fixed focuses lenses. Since auto-focus techniques can use a lens with a shallower depth of field, more light can be captured, which can improve the image quality. Fast-focusing lenses are available, such as liquid lenses that can change focus in 1-3 ms. Distance sensing devices, such as time-of-flight sensors, can be used to detect the height of an object, which can be used to drive the auto-focus of the lens. Time-of-flight sensors can operate at rates of 3-5 KHz, for example.

While auto-focus techniques can improve image quality, the inventors have discovered and appreciated that such techniques may not be able to focus fast enough to allow the imaging device to capture a sufficient number of high-quality images of the object. For example, high speed logistics applications can use conveyor belts that move objects at very high rates, such as 600-800 feet per minute (or 10-13.5 feet per second). Therefore, objects may only within the field of view of an imaging device for less than a second, and maybe for less than 100-500 ms. Imaging sensors typically operate at 50-60 Hz, which is around 15-20 ms for each image. For high speed logistics applications, the imaging device may only be able to capture a few useful images of an object while it is within the imaging sensor's field of view (e.g., such as only 1-2 images of the full barcode on an object). This problem can be further compounded for high objects that are closer to the imaging sensor, which can further limit opportunities to capture sufficient images of the object (e.g., since the field of view is more limited for higher objects, so the objects are in the field of view for less time than shorter objects). The system can be further limited by the distance sensing device. For example, while time-of-flight sensors can operate at high rates (e.g., such that the time-of-flight sensor can obtain 10-20 time-of-flight readings between each image capture of a 50-60 Hz imaging device), time-of-flight sensors can only provide accurate height measurements when the entire object is within the field-of-view of the time-of-flight sensor. Therefore, for many machine vision systems, such as systems that dispose the time-of-flight sensor at or near the image sensor, time-of-flight sensors typically do not provide for fast-enough height measurement to drive auto-focus applications.

The inventors have therefore recognized and appreciated that it is desirable to provide for fast object height detection to address these and other problems with existing machine vision systems. For example, fast object height detection can be used to focus the lens assembly prior to and/or just as the object (or a relevant portion of the object) moves into the field of view of the imaging device so that the imaging device has a maximum amount of time to capture images of the object while it is within the imaging device's field of view. The inventors have developed techniques to predict the height of a moving object before the entire object is within the field of view of a distance sensing device. Such techniques can allow a machine vision system to include both the imaging device and the distance sensing device within a single package and still allow the machine vision system to auto-focus the lens assembly sooner than otherwise possible with previous distance sensing devices. For example, if a distance measuring device takes N acquisitions of an object as it enters the field of view of the distance measuring device until the object entirely enters the field of view, the techniques can estimate the object parameters 50% (e.g., ½×N fewer acquisitions) sooner. Such techniques can additionally or alternatively provide greater accuracy than can otherwise be achieved with imperfect data. For example, the techniques can perform auto-focus with just a few noisy distance measurements (e.g., only a few noisy distance measurements made before the object is completely within the field-of-view of the system), which can provide for performing auto-focus at much faster conveyer speeds than previously possible.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 2:
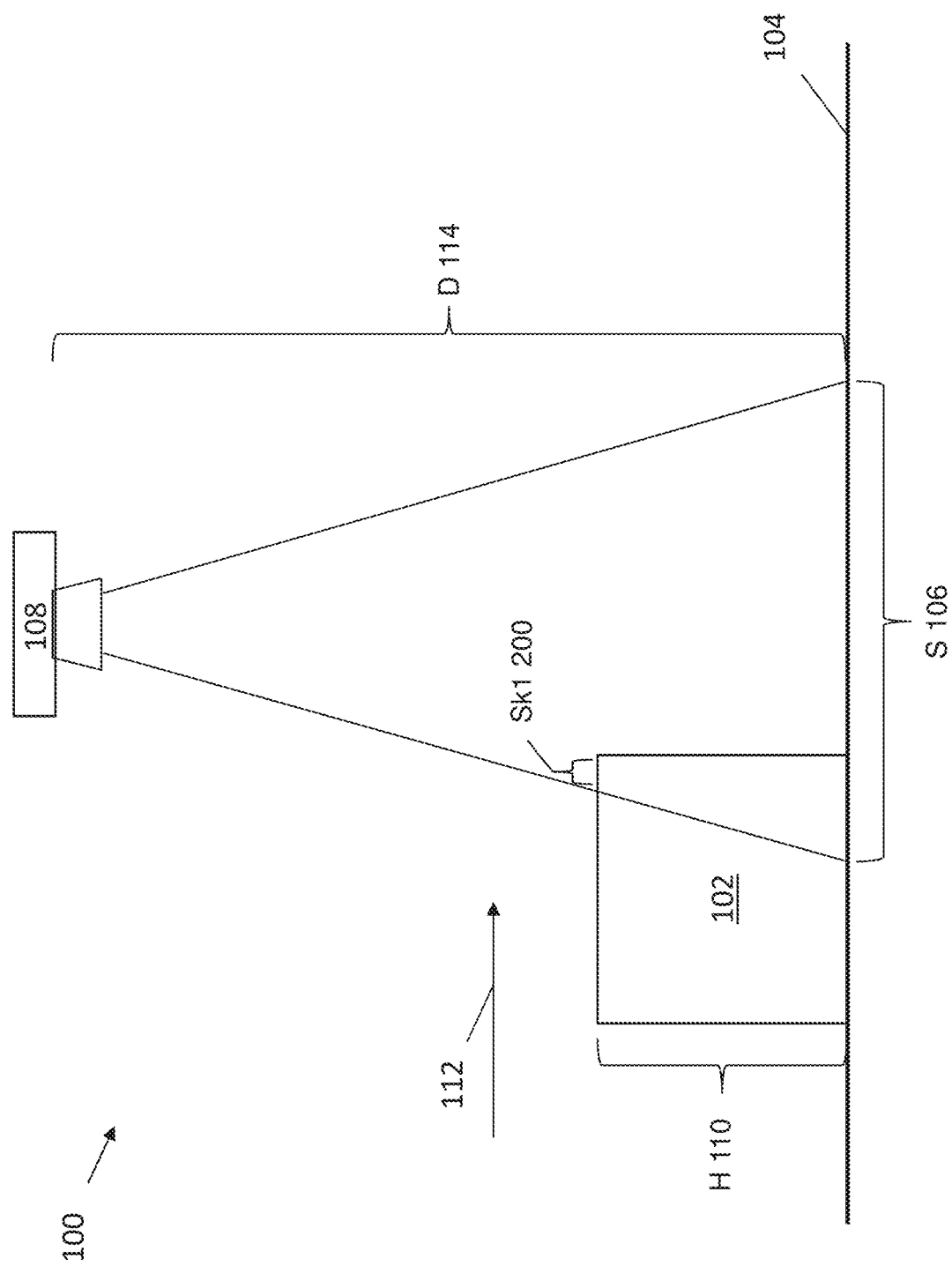
FIG. 2 is a diagram showing the object from FIG. 1 moved further along so that the object is partially in the field of view of the image sensing device, according to some embodiments of the technology described herein.
Figure 3:
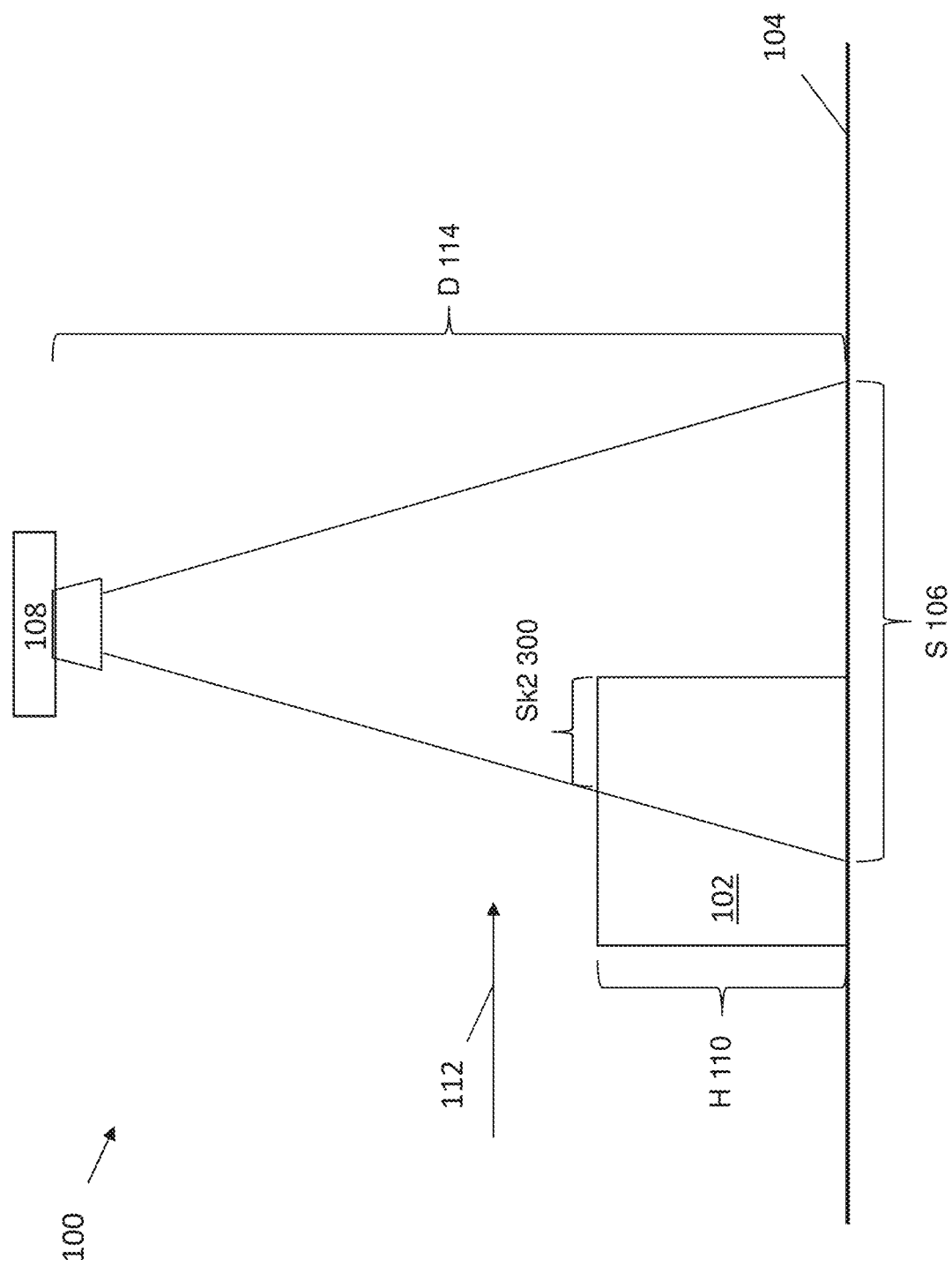
FIG. 3 is a diagram showing the object from FIG. 1 having moved further along so that the object is further in the field of view of the image sensing device compared to FIG. 2, according to some embodiments of the technology described herein.

FIG. 1 is a diagram 100 showing an exemplary machine vision system application with an object 102 moving on a conveyor belt 104 towards the field of view S 106 of an image sensing device 108, according to some embodiments of the technology described herein. In this example, the object 102 has a height H 110, and the object 102 is moving on the conveyor belt 104 in direction 112. The image sensing device 108 is a distance D 114 from the conveyor belt 104. FIG. 2 is a diagram showing the object 102 from FIG. 1 moved further along direction 112 so that object 102 is partially in the field of view S 106 of the image sensing device 108, according to some embodiments of the technology described herein. As shown in FIG. 2, a portion Sk1 200 of the top surface of the object 102 is within the field of view S 106. FIG. 3 is a diagram showing the object 102 from FIG. 1 having moved further along direction 112 so that object 102 is further in the field of view S 106 of the image sensing device 108 compared to FIG. 2, according to some embodiments of the technology described herein. As shown in FIG. 3, a portion Sk2 300 of the top surface of the object 102 is within the field of view S 106. The portion Sk2 300 is greater than the portion Sk1 200 of FIG. 2.

While FIGS. 1-3 just show one object 102, it should be appreciated that many objects can travel on the conveyor belt, and those objects may not be of uniform shape, spacing, and/or the like. Therefore, in many vision system applications, such as symbology-decoding in logistics operations (e.g. tracking barcodes on packages as they pass down a conveyor line), the number, height, length, overall size and spacing gap between objects can be highly variable.

In some embodiments, the distance sensing device is a time-of-flight sensor, such as an integrated single-point or multi-point time-of-flight sensor that predicts distance information. The time-of-flight sensor can include an emitter configured to emit a beam, such as a laser beam or a light pulse (e.g., an IR-based light pulse), and a receiver configured to receive the reflected beam. The time-of-flight sensor can modulate the intensity of the beam at a high frequency, such that there is a phase shift between the emitted beam and the reflected beam. The time-of-flight sensor can include circuitry to measure the degree of phase shift by comparing the phase at the emitter with that at the receiver. The measured phase shift is then converted to a distance measurement based on calibration parameters that reside within the sensor and/or external electronics.

While not shown, the distance sensing device 108 can be disposed near the imaging device, such as incorporated into a single package with the imaging device and/or mounted near the imaging device (e.g., mounted to a lens assembly of the imaging device). An exemplary configuration can include an imaging device integrated with a ToF sensor and/or an illumination device, such as the High-Powered Integrated Torch (HPIT) provided by Cognex Corporation, the assignee of the present application. Another exemplary configuration can include an imaging device and a ToF sensor mounted at a different location than the imaging device. In such examples, the imaging device and ToF sensor can be mounted with one or more configuration constraints, such as with optical axes that are perpendicular to the conveyor, at a same height, with the ToF sensor upstream of the conveyor belt from the imaging device such that the ToF sensor can perform measurements before the object reaches the imaging device, and/or other system configuration constraints. In some embodiments, the imaging device can include one or more internal processors (e.g., FPGAs, DSPs, ARM processors, and/or the like) and other components that allow it to act as a standalone unit, providing a desired output data (e.g. decoded symbol information) to a downstream process, such as an inventory tracking computer system or logistics application. In some embodiments, the machine vision system can include external processing functionality, such as a personal computer, laptop, and/or the like, that is configured to provide the machine vision system processing functionality.

In some embodiments, the machine vision system can be an image-based symbology reader. The reader can include an imaging device with an image sensor and optics and a vision system processor, which is arranged to find and decode symbols (e.g., barcodes) in images acquired by the image sensor. The distance sensing device 108 can be integrated with the imaging device, which predicts distance information as described herein (e.g., in conjunction with FIGS. 4A-5B) for the object 102 in the field of view of the image sensor. The time-of-flight sensor can be operatively connected with at least one of the vision system processor and/or a imager control.

In some embodiments, the imaging device can include and/or be in optical communication with a lens assembly. The choice of lens configuration can be driven by a variety of factors, such as lighting/illumination, field of view, focal distance, relative angle of the camera axis and imaged surface, and/or the size of the details on the imaged surface. In some examples, the cost of the lens and/or the available space for mounting the vision system can also drive the choice of lens. An exemplary lens configuration that can be desirable in certain vision system applications is an automatic focusing (auto-focus) assembly. By way of example, an auto-focus lens can be facilitated by a so-called liquid lens assembly.

The use of a liquid lens can simplify installation, setup and maintenance of the vision system by eliminating the need to manually touch or adjust the lens. Relative to other auto-focus mechanisms, the liquid lens can have fast response times. Liquid lenses can also be used for applications with reading distances that change from object-to-object (surface-to-surface) or during the changeover from the reading of one object to another object, such as scanning a moving conveyor containing differing sized/height objects (e.g., such as shipping boxes). While the example shown in FIGS. 1-3 shows a conveyor belt machine vision application, it should be appreciated that it can be desirable to quickly focus for imaging in many different vision system applications, and the techniques described herein are therefore not limited to such exemplary embodiments.

Liquid lenses can be implemented in different manners. One exemplary liquid lens embodiment uses water and oil, and can essentially shape the oil into a lens using an applied voltage. The variation of voltage passed through the lens by surrounding circuitry leads to a change of curvature of the oil-water interface, which in turn leads to a change of the focal length of the lens. Another exemplary liquid lens embodiment uses a movable membrane covering a liquid reservoir to vary its focal distance. A bobbin can exerts pressure to alter the shape of the membrane and thereby vary the lens focus. The bobbin can be moved by varying the input current within a preset range. Differing current levels can provide differing focal distances for the liquid lens.

As described herein, the range/distance information from the distance sensing device can be processed to auto-focus a variable (e.g. liquid) lens during runtime operation based on the particular size/shape object(s) within the field of view and before the object(s) are fully within the field of view of the time-of-flight sensor. For example, predicted distance information can be used to set the focus distance of the lens of the imaging device prior to the object being partially and/or entirely within the field of view of the imaging device. In some embodiments, the system is configured such that the distance measuring device has a higher speed than the than the imaging sensor. For example, a 50 Hz imaging sensor can be used with a 4 KHz time-of-flight sensor.

Figure 4A:
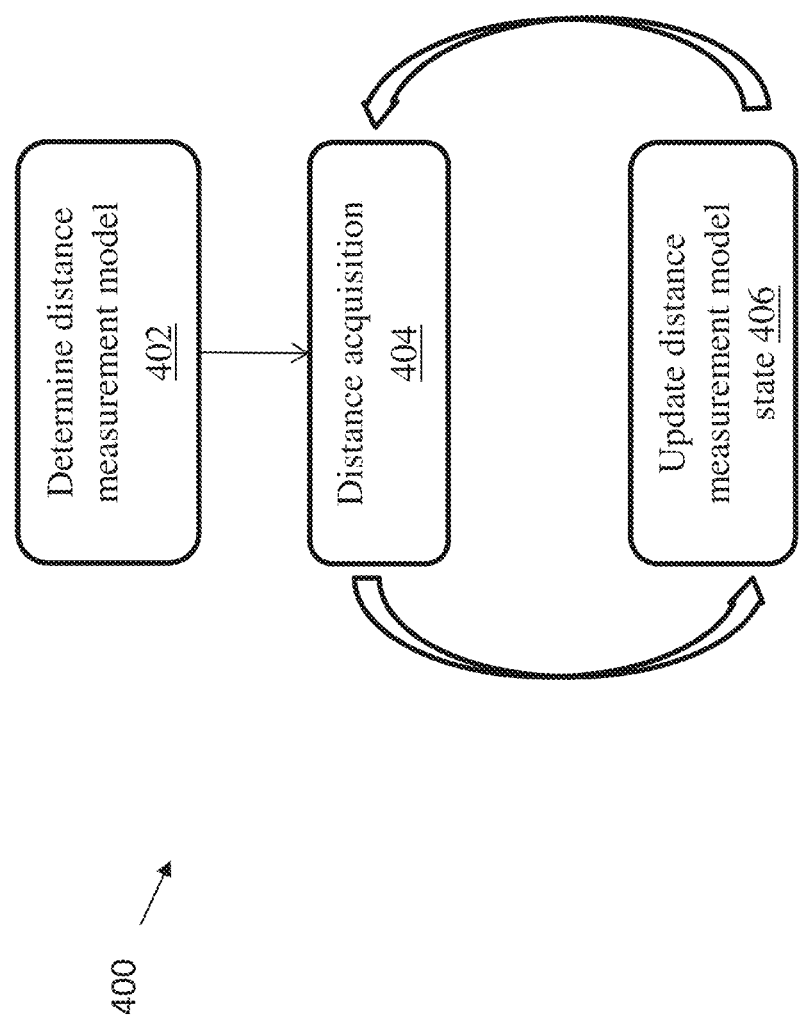
FIG. 4A is a diagram showing an exemplary method for determining and updating a distance measurement model using range measurements, according to some embodiments of the technology described herein.

FIG. 4A is a diagram showing an exemplary method 400 for determining and updating a distance measurement model using range measurements, according to some embodiments of the technology described herein. The machine vision system can perform the method 400 to predict features of objects (e.g., height, area, etc.) prior to the objects being entirely within the field of view of a distance sensing device. For example, referring to FIGS. 2 and 3, the method 400 can be used to predict the height H 110 of the object 102 prior to the object 102 being entirely within the field of view S of the distance sensing device 108. At step 402, the machine vision system determines a feature measurement model, such as a distance measurement model that models the distance measurements of the distance sensing device to the object over time as the object enters the field of view of the distance sensing device to predict the height of the object prior to the object being entirely within the field of view. As described herein, the machine vision system can determine the distance measurement model based on predetermined parameters and/or based on initial distance measurements of the object as the object begins to enter the field of view.

The machine vision system continues to acquire distance data over time, and to update the distance measurement model accordingly. At step 404, the machine vision system acquires and/or processes new distance measurement data. At step 406, the machine vision system updates the distance measurement model state 406 based on the distance measurement data acquired at step 404. The method proceeds back to step 404 and processes and/or acquires new distance measurement data. The method performs steps 404 and 406 until the distance measurement model sufficiently converges with the distance measurement data. For example, as described further herein, the machine vision system can determine that the distance measurement model converges with the time-of-flight measurement data when changes in the distance measurement model and/or the estimated object height determined at step 406 is below a predetermined threshold.

FIG. 4B is a diagram showing an exemplary detailed method 450 for determining and updating a distance measurement model using distance sensing measurements, according to some embodiments of the technology described herein. At step 452, the machine vision system accesses first distance data determined by a distance sensing device (e.g., a time-of-flight sensor) at a first time. The distance sensing device captured and/or determined the first distance data with an object at a first position that is only partially within the field-of-view of the distance sensing device. For example, referring to FIG. 2, the distance sensing device 108 captured the first distance data with the object 102 only partially within the field-of-view S 106, as shown by Sk1 200.

At step 454, the machine vision system accesses second distance data determined by the distance sensing device at a second, subsequent time after the first time. The distance sensing device captured and/or determined the second distance data with the object at a second position that is still only partially within the field-of-view of the distance sensing device. Since the distance data is determined over time as the object moves, the first position associated with the first distance data is different than the second position associated with the second distance data. For example, referring to FIG. 3, the distance sensing device 108 captured the second distance data with the object 102 only partially within the field-of-view S 106, as shown by Sk2 300. Compared to FIG. 2, while the object 102 is only partially within the field-of-view S 106 in both FIGS. 2-3, the object 102 is further within the field-of-view S 106 in FIG. 3 than in FIG. 2 (and hence Sk2 300 is greater than Sk1 200).

As described herein, the distance sensing device can be a time-of-flight sensor that is part of a machine vision system that also includes internal and/or external processing hardware and associated software to perform machine vision tasks. Referring to steps 452 and 454, accessing the first and second distance data can include the processing hardware (e.g., which is part of the imaging device) receiving first and second time-of-flight measurements from the time-of-flight sensor. As another example, the processing hardware can access the time-of-flight measurements from a memory shared with the time-of-flight sensor.

At step 456, the machine vision system determines a distance measurement model for the object based on the first distance data and the second distance data. The distance measurement model is configured to model a physical parameter of the object within the field-of-view of the distance sensing device over time, such as the height of the object, the surface area of the object, and/or the like. At step 458, the machine vision system determines, based on the previous distance data (e.g., the first distance data and the second distance data for the first execution) and the distance measurement model, distance data that is indicative of an estimated distance to the object prior to the object being entirely within the field-of-view of the distance sensing device.

At step 460, the machine vision system determines whether the distance measurement model converges with the distance measurement data. In some embodiments, the machine vision system can determine that changes in the distance measurement model are below a predetermined threshold. In some embodiments, the machine vision system can determine that changes between the distance measurement data and the estimated object height (e.g., the data determined at step 458) is below a predetermined threshold. For example, as described further in conjunction with Equations 1-2, the object height can be modeled as a parameter that is part of the observation matrix and the observation matrix can be updated each iteration. If, after a number of iterations, the predicted height is close to the observation (e.g., within a threshold), the system can determine that the model used at the current iteration is sufficient and can use the observation matrix to determine the height of the object (e.g., such that the distance measurement model is stable at this state). If the machine vision system determines that the distance measurement model does not converge with the distance measurement data, the method 450 proceeds to step 462 and updates the distance measurement model with one or more additional distance measurements, and proceeds back to step 458.

If the machine vision system determines that the distance measurement model converges with the distance measurement data, the method 450 proceeds to step 464 and the machine vision system determines, based on the distance data determined at step 458, data indicative of a height of the object. For example, the machine vision system can use the last-determined data from step 458 as being indicative of the object height.

As described herein, the machine vision system can use the data indicative of the height of the object to perform various tasks of the machine vision system. For example, the machine vison system can determine, based on the distance data, data indicative of a focus adjustment for the lens of the imaging device associated with the distance sensing device. The machine vision system can transmit, based on the data indicative of the focus adjustment, one or more signals to change a focus of the lens. In some embodiments, the machine vision system uses the focus adjustment to change the focus of a liquid lens. The machine vision system can capture an image of the object after transmitting the one or more signals to change the focus of the lens. In some embodiments, the machine vision system can be configured to wait a predetermined amount of time after transmitting the one or more signals to change the focus of the lens prior to capturing the image of the object. In some embodiments, the system can receive feedback data from the liquid lens assembly indicative of the focus adjustment being completed, and the machine vision system can capture the image responsive to receipt of the feedback data.

In some embodiments, the machine vision system can determine, based on the estimated distance data, data indicative of a brightness adjustment for an illumination module of the imaging device. For example, if the distance data is indicative of a short object, the machine vision system may be configured to user a higher brightness setting for the illumination module compared to when the distance data is indicative of a higher object. Therefore, the machine vision system can be configured to use brighter illumination for objects further away from the imaging device, and softer illumination for objects that are closer to the imaging device. In some embodiments, to adjust the illumination of objects the techniques can adjust the exposure time of the imaging device to adjust image brightness (e.g., without adjusting the illumination module). For example, the system can reduce exposure time for objects closer to the camera.

In some embodiments, the machine vision system can access data indicative of at least one constraint the machine vision application. For example, the machine vision system can access data indicative of a motion parameter of the object that is associated with the motion of the box through the field-of-view of the time-of-flight sensor. The machine vision system can use the data indicative of the motion parameter(s) to determine the distance data. For example, referring to FIG. 4B, at step 458 the machine vision system can determine the distance data based on the first distance data, the second distance data, the distance measurement model, and the one or more motion parameters. In some embodiments, the motion parameter includes a velocity of the object and/or an acceleration of the object as the object travels through the field-of-view of the distance sensing device. For example, the machine vision system can determine the distance data based on the first distance data, the second distance data, the distance measurement model, and the velocity of the object.

In some embodiments, the machine vision system can use a Kalman filter to model the distance to the object as the object enters the field of view of the distance sensing device. For example, the machine vision system can use a Kalman filter to estimate the object of the area over time. Referring to step 458 in FIG. 4B, for example, the machine vision system can determine, using the distance measurement model, estimates of the object area based on the acquired distance data (e.g., acquired at steps 452, 454 and/or 462). For example, the machine vision system can determine a first object area estimate of the object (which is only partially within the field-of-view of the distance sensing device) based on the first distance data. The machine vision system can use the Kalman filter to determine subsequent object area estimates. For example, the machine vision system can determine, using the distance measurement model, a second object area estimate of the object (which is still only within the field-of-view of the distance sensing device) based on the first object area estimate and the second distance data. The machine vision system can determine, based on the second object area estimate, a height estimate of the object.

The machine vision system can be configured to use one or more equations to measure the state (e.g., the area of the object within the field of view) and/or perform a measurement update (e.g., to update the estimated distance to the object) of the distance sensing device. Exemplary Equation 1 below can be used to perform a state update:

$$S_k = S_{k-1} + S_\Delta + w_k \qquad \text{Equation 1}$$

Where:

$S_k$ is the area of the top surface of the object within the field of view of the distance sensing device at the current time k;

$S_{k-1}$ is the area of the top surface of the object within the field of view of the distance sensing device at the previous time k−1;

$S_\Delta$ is the difference between $S_k$ and $S_{k-1}$; and $w_k$ is a model for system noise, random variation, and/or measurement noise/inaccuracy.

As shown in Equation 1, the states can be the object area in the field-of-view of the distance determining device. The states can be modeled based on parameters of the machine vision system. For example, if the objects move at a near-constant speed (such as on a conveyor belt) and the frame rate of the TOF sensor is sufficiently high enough, the state update can be modeled with a linear function in which the change of object area is constant in unit time. In some embodiments, the first two object area measurements can be initial values determined based on the machine vision application specification, such as box size range, conveyor belt width, object moving speed, and/or the like. It should be appreciated the initial object area measurements need not be accurate. For example, $w_k$ can be used to model noise from the physical world, such as the non-consistent speed of the conveyor belt, etc. The values for $w_k$ (e.g., and $v_k$, below) can be modeled in terms of the system noise and an observation covariance matrix. The parameter $w_k$ can be assigned an initial value based on the application (e.g., based on expected variations of the conveyor speed, the accuracy of the TOF reading, etc.). The initial value(s) need not necessarily be accurate, but can be updated for each iteration to improve accuracy using the Kalman filter. From the third state (and onwards), the object areas and/or height are obtained and determined from the model using real-time distance measurements, and the model can be update for each new distance measurement.

Equation 2 provides an exemplary equation for performing a distance measurement:

$$TOF_k = -(h/S)S_k + d + v_k \qquad \text{Equation 2}$$

Where:

$TOF_k$ is the time-of-flight measurement at time k;

h is the height of the object;

S is the field-of-view of the time-of-flight sensor;

$S_k$ is the area of the top surface of the object within the field of view of the distance sensing device at the current time k;

d is the distance between the time-of-flight sensor and the conveyor belt; and $v_k$ is a model for observation noise in the distance measurement (e.g., noise that comes from the inaccuracy of the TOF reading).

Referring to Equation 2, the TOF sensor reading can be determined based on a weighted average of the object height h and the distance d.

It should be appreciated that Equations 1 and 2 are provided for illustrative purposes only, and that other models can be used for the particular machine vision application. For example, other formats of the Kalman filter model can be used depending on whether the object moving is subject to acceleration(s), whether the object area changes, and/or other variables. Over time, measurements of the time-of-flight sensor can slowly decrease (e.g., from measuring a distance to the conveyor belt to measuring a distance to the top of the object) as the object comes into the field-of-view of the time-of-flight sensor. The estimated box area that can be determined by the model can correspondingly slowly increase over time to be inversely proportional to the time-of-flight measurements, such that the estimated box area increases over time.

Figure 5A:
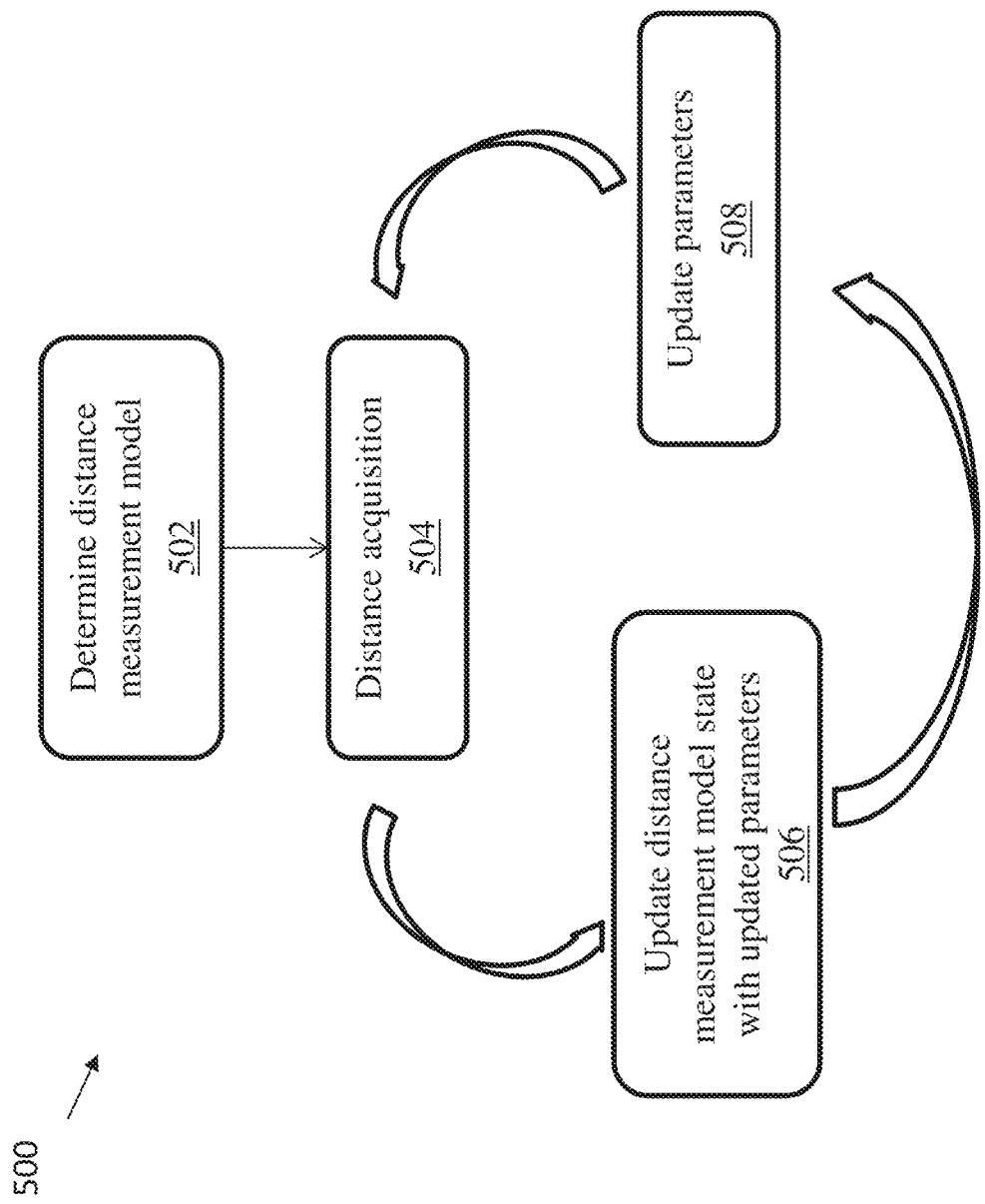
FIG. 5A is a diagram showing an exemplary method for determining and updating a distance measurement model using distance measurements and parameter estimation, according to some embodiments of the technology described herein.

In some embodiments, the machine vision system can use parameter estimation techniques (e.g., Expectation Maximization (EM), Maximum A Posteriori (MAP), and/or the like) to update parameters of the model. For example, as shown in exemplary Equation 2, the object height can be part of the observation matrix. A parameter estimation algorithm can be used at each iteration to update the box height. FIG. 5A is a diagram showing an exemplary method 500 for determining and updating a distance measurement model using distance measurements and parameter estimation, according to some embodiments of the technology described herein. At step 502, the machine vision system determines a distance measurement model using the techniques described herein. Each time the system obtains a new distance observation at step 504, at step 506 the system uses the model (e.g., a Kalman filter) to update the state of the distance measurement model, and at step 508 the machine vision system uses parameter estimation to update the system observation matrix.

Figure 5B:
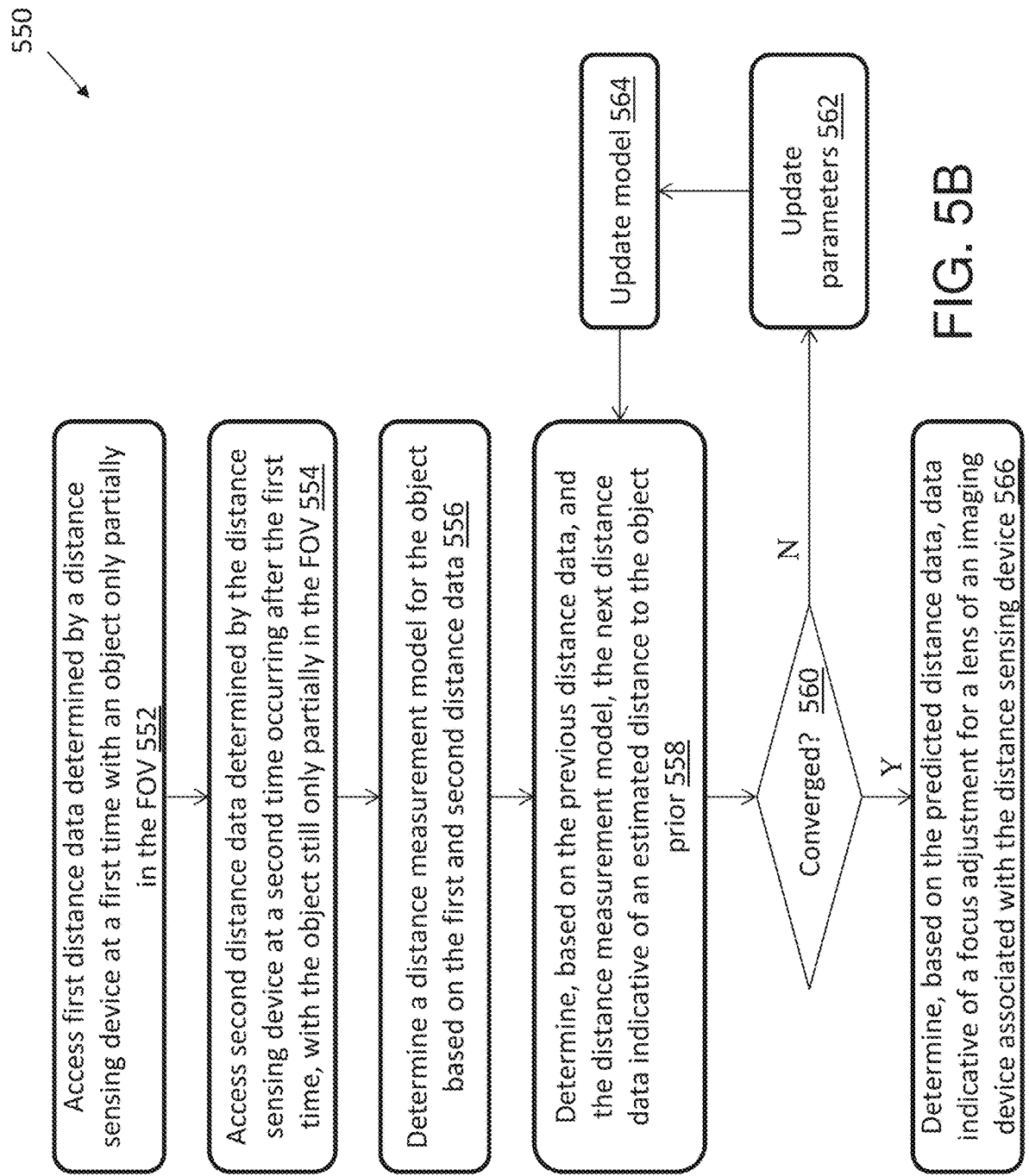
FIG. 5B is a diagram showing an exemplary detailed method for determining and updating a distance measurement model using distance measurements and parameter estimation, according to some embodiments of the technology described herein.

FIG. 5B is a diagram showing an exemplary detailed method 550 for determining and updating a distance measurement model using distance measurements and parameter estimation, according to some embodiments of the technology described herein. At step 552, the machine vision system accesses first distance data determined at a first time with an object at a first position that is only partially within the field-of-view of the distance sensing device (e.g., as shown in FIG. 2). At step 554, the machine vision system accesses second distance data determined at a second, subsequent time with the object at a second position that is still only partially within the field-of-view of the distance sensing device (e.g., as shown in FIG. 3). At step 556, the machine vision system determines a distance measurement model for the object based on the first distance data and the second distance data.

At step 558, the machine vision system determines, based on the previous distance data (e.g., the first distance data and the second distance data for the first execution) and the distance measurement model, distance data that is indicative of an estimated distance to the object prior to the object being entirely within the field-of-view of the distance sensing device. At step 560, the machine vision system determines whether the distance measurement model converges with the distance measurement data. If the machine vision system determines that the distance measurement model does not converge with the distance measurement data, the method 550 proceeds to step 562 and updates the parameters using parameter estimation (e.g., using EM, MAP, and/or another parameter estimation technique). The method proceeds to step 564 and updates the distance measurement model with one or more additional distance measurements, and proceeds back to step 558.

If the machine vision system determines that the distance measurement model converges with the distance measurement data, the method 550 proceeds from step 560 to step 564 and the machine vision system determines, based on the distance data determined at step 558, data indicative of a height of the object. For example, the machine vision system can use the last-determined data from step 558 as being indicative of the object height.

As described herein, measurements of the time-of-flight sensor can slowly decrease (e.g., from measuring a distance to the conveyor belt to measuring a distance to the top of the object) as the object comes into the field-of-view of the time-of-flight sensor. The estimated box area determined using the distance measurement model can correspondingly slowly increase over time to be inversely proportional to the time-of-flight measurements, such that the estimated box area increases over time. In some embodiments, using parameter estimation can fine-tune the relation between the time-of-flight measurements and the box area measurements.

The predicted distance information generated by the distance sensing device can also be employed to perform other aspects of the machine vision system. In some embodiments, the machine vision system can use the predicted distance information to self-trigger image acquisition of an object by the vision system. For example, when the system determines a change in object distance (for example, a change in height from the supporting base/conveyor belt), the system can trigger an image capture. In some embodiments, the machine vision system can use the predicted distance information to perform object (e.g. box) size dimensioning. During calibration, the machine vision system can measure the distance D 114 between the conveyor belt and vision system and store the information. At runtime, the machine vision system can capture images and can predict the distance to the object prior to the object being entirely within the image and/or measure the distance to the object in the center of the image/field of view. If the system detects a rectangular shape, the dimensions of that rectangle can be determined based on the predicted and/or measured distance (e.g., and based on known optical properties of imager, such as the image sensor size, lens focal length, etc.). As shown in FIGS. 1-3, the height 110 of object 102 can be representative of essentially the difference between the height of the imaging device from conveyor belt 104 and a predicted and/or measured shortest distance between the imaging device and the object 102. In some embodiments, since the imaging device is fixedly mounted to the time-of-flight sensor, the height between the imaging device and object 102 can be represented by distance D 114.

In some embodiments, the machine vision system can be used to detect and analyze object defects. For example, after the machine vision system detects the (e.g., rectangular) top surface as described herein, the machine vision system can measure deviations from the top surface shape to detect damaged objects (e.g., damaged boxes). In some embodiments, the system can perform region of interest (RoI) detection. For example, the field of view of a camera-based symbology reader can be imaged onto the sensed area of a multi-point (e.g., n×1 or n×m) time-of-flight sensor array. The sensor array can measure a 3D height map to narrow the region of interest for symbology decoding. Determining in which part of the image the object resides can reduce decoding time because symbol candidate features can be searched from a narrowed region of interest in the overall acquired image.

In some embodiments, the machine vision system can detect a gap between objects in the field of view, which can assist in linking symbol codes to the appropriate imaged object. For example, in logistics applications where there can be more than one object entering and/or within the field of view at a time, the time-of-flight measurements can assist in locating the edge(s) of the object and to determine what symbol is associated with each object in the field of view.

In some embodiments, the machine vision system can use the distance predicted and/or measured by the time-of-flight sensor to limit the reading range of the vision system to prevent unintentional reading. For example, if the distance to the object is within a defined range, then the machine vision system (a) captures an image, (b) initiates a symbol decoding process, and/or (c) transmits the decoded data for further processing.

Techniques operating according to the principles described herein may be implemented in any suitable manner. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, FPGA chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. Alternatively, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present application as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "code", "program" or "software" are used herein in a generic sense to refer to any type of computer code or set of computer-executable instructions that can be employed to program a computer or other processor to implement various aspects of the present application as discussed above. Additionally, it should be appreciated that according to one aspect of this embodiment, one or more computer programs that when executed perform methods of the present application need not reside on a single computer or processor, but may be distributed in a modular fashion amongst a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present application may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computerized method, comprising:
   accessing first distance data determined by a distance sensing device at a first time, wherein the distance sensing device determined the first distance data with an object at a first position within a field-of-view of the distance sensing device, wherein the object is only partially in the field-of-view at the first position;
   accessing second distance data determined by the distance sensing device at a second time occurring after the first time, wherein the distance sensing device determined the second distance data with the object at a second position within the field-of-view of the distance sensing device, wherein the first position is different than the second position, and the object is only partially in the field-of-view at the second position;
   determining a distance measurement model for the object based on the first distance data and the second distance data, wherein the distance measurement model is configured to model a physical parameter of the object to predict the physical parameter of the object when the object moves within the field-of-view of the distance sensing device over time, including future times that will occur after the first and second times;

determining, based on the first distance data, the second distance data, and the distance measurement model, third distance data indicative of an estimated distance to the object, wherein the estimated distance predicts a distance to the object at a future time when the object will be within the field-of-view of the distance sensing device prior to the object actually being entirely within the field-of-view of the distance sensing device; and determining, based on the third distance data, data indicative of a height of the object.

2. The computerized method of claim 1, wherein the physical parameter of the object comprises an area of the object, a height of the object, or some combination thereof.

3. The computerized method of claim 1, further comprising:

determining, based on the third distance data, data indicative of a focus adjustment for a lens of an imaging device associated with the distance sensing device.

4. The computerized method of claim 3, further comprising transmitting, based on the data indicative of the focus adjustment, one or more signals to change a focus of the lens.

5. The computerized method of claim 4, further comprising capturing an image of the object after transmitting the one or more signals to change the focus of the lens.

6. The computerized method of claim 1, further comprising:

determining, based on the third distance data, data indicative of a brightness adjustment for an illumination module of an imaging device associated with the distance sensing device.

7. The computerized method of claim 1, further comprising:

accessing data indicative of a motion parameter of the object; and determining the third distance data comprises determining the third distance data based on the first distance data, the second distance data, the distance measurement model, and the motion parameter.

8. The computerized method of claim 7, wherein the motion parameter comprises a velocity of the object as the object travels through the field-of-view of the distance sensing device.

9. The computerized method of claim 8, wherein the motion parameter comprises an acceleration of the object as the object travels through the field-of-view of the distance sensing device.

10. The computerized method of claim 8, wherein determining the third distance data comprises determining the third distance data based on the first distance data, the second distance data, the distance measurement model, and the velocity of the object.

11. The computerized method of claim 1, wherein the distance sensing device comprises a time-of-flight sensor, and accessing the first and second distance data comprises receiving first and second time-of-flight measurements from the time-of-flight sensor.

12. The computerized method of claim 1, wherein determining the third distance data based on the first distance data, the second distance data, and the distance measurement model comprises:

determining, using the distance measurement model, a first object area estimate of a first area of the object within the field-of-view of the distance sensing device based on the first distance data; and determining, using the distance measurement model, a second object area estimate of a second area of the object within the field-of-view of the distance sensing device based on the first object area estimate and the second distance data.

13. The computerized method of claim 12, wherein the distance measurement model is a Kalman filter.

14. The computerized method of claim 12, further comprising determining, based on the second object area estimate, a height estimate of the object.

15. The computerized method of claim 14, wherein determining the height estimate of the object comprises determining, using a parameter estimation algorithm, the height estimate based on the second object area estimate.

16. The computerized method of claim 15, wherein the parameter estimation algorithm is an Expectation Maximization (EM) algorithm, a Maximum A Posteriori (MAP) algorithm, or some combination thereof.

17. The computerized method of claim 1, further comprising:

updating, based on the third distance data, a focus adjustment for a lens of an imaging device associated with the distance sensing device; and capturing an image of the object after updating the focus adjustment for the lens.

18. The computerized method of claim 1, further comprising:

adjusting, based on the third distance data, a brightness setting for an illumination module of an imaging device associated with the distance sensing device; and capturing an image of the object after adjusting the brightness setting for the illumination module.

19. At least one non-transitory computer-readable storage medium storing processor-executable instructions that, when executed by at least one computer hardware processor, cause the at least one computer hardware processor to perform the acts of:

accessing first distance data determined by a distance sensing device at a first time, wherein the distance sensing device determined the first distance data with an object at a first position within a field-of-view of the distance sensing device, wherein the object is only partially in the field-of-view at the first position;

accessing second distance data determined by the distance sensing device at a second time occurring after the first time, wherein the distance sensing device determined the second distance data with the object at a second position within the field-of-view of the distance sensing device, wherein the first position is different than the second position, and the object is only partially in the field-of-view at the second position;

determining a distance measurement model for the object based on the first distance data and the second distance data, wherein the distance measurement model is configured to model a physical parameter of the object to predict the physical parameter of the object when the object moves within the field-of-view of the distance sensing device over time, including future times that will occur after the first and second times;

determining, based on the first distance data, the second distance data, and the distance measurement model, third distance data indicative of an estimated distance to the object, wherein the estimated distance predicts a distance to the object at a future time when the object will be within the field-of-view of the distance sensing device prior to the object actually being entirely within the field-of-view of the distance sensing device; and determining, based on the third distance data, data indicative of a height of the object.

20. The computer readable medium of claim 19, wherein the processor-executable instructions further cause the at least one computer hardware processor to perform the acts of:

accessing data indicative of a motion parameter of the object; and determining the third distance data comprises determining the third distance data based on the first distance data, the second distance data, the distance measurement model, and the motion parameter.

21. An apparatus comprising a processor in communication with a memory, the processor being configured to execute instructions stored in the memory that cause the processor to:

access first distance data determined by a distance sensing device at a first time, wherein the distance sensing device determined the first distance data with an object at a first position within a field-of-view of the distance sensing device, wherein the object is only partially in the field-of-view at the first position;

access second distance data determined by the distance sensing device at a second time occurring after the first time, wherein the distance sensing device determined the second distance data with the object at a second position within the field-of-view of the distance sensing device, wherein the first position is different than the second position, and the object is only partially in the field-of-view at the second position;

determine a distance measurement model for the object based on the first distance data and the second distance data, wherein the distance measurement model is configured to model a physical parameter of the object to predict the physical parameter of the object when the object moves within the field-of-view of the distance sensing device over time, including future times that will occur after the first and second times;

determine, based on the first distance data, the second distance data, and the distance measurement model, third distance data indicative of an estimated distance to the object, wherein the estimated distance predicts a distance to the object at a future time when the object will be within the field-of-view of the distance sensing device prior to the object actually being entirely within the field-of-view of the distance sensing device; and determine, based on the third distance data, data indicative of a height of the object.

22. The apparatus of claim 21, wherein the processor is further configured to execute instructions stored in the memory that cause the processor to:

access data indicative of a motion parameter of the object; and determine the third distance data comprises determining the third distance data based on the first distance data, the second distance data, the distance measurement model, and the motion parameter.

* * * * *